United States Patent [19]

Arnon

[11] Patent Number: 4,476,558
[45] Date of Patent: Oct. 9, 1984

[54] TIME COMPRESSION MULTIPLEX DIGITAL TRANSMISSION SYSTEM

[75] Inventor: Ephraim Arnon, Nepean, Canada

[73] Assignee: Northern Telecom Limited, Montreal, Canada

[21] Appl. No.: 402,952

[22] Filed: Jul. 29, 1982

[51] Int. Cl.³ .............................................. H04J 3/06
[52] U.S. Cl. .................................... 370/100; 370/104
[58] Field of Search ................. 370/29, 109, 100, 104

[56] References Cited

U.S. PATENT DOCUMENTS 4,049,908  9/1977  Knorpp et al. .................... 178/58 R
4,239,934  12/1980  Andren ............................... 370/109

OTHER PUBLICATIONS

Paper, entitled, "A Long Burst Time-Shared Digital Transmission System for Subscriber Loops" by J. P. Andry et al., Societe Anonyme de Telecommunications, Paris, France, International Symposium on Subscriber Loops and Services, pp. 31-35.

Paper, entitled "Realisation d'un Equipement Terminal Numerique d'abonne pour Service Telephonique et de Donnees", by R. Montemurro et al., Colloque International de Commutation, International Switching Symposium, Paris, France, May 11, 1979, pp. 926-933.

Primary Examiner—Douglas W. Olms
Assistant Examiner—Kenneth I. Rokoff
Attorney, Agent, or Firm—John E. Mowle

[57] ABSTRACT

A digital transmission system in which bursts of digital signals are transmitted in opposite directions over a two wire telephone loop at fixed frame intervals. Each signal burst is bounded by initial and final synchronization bits at its beginning and ending respectively. Once frame synchronization is established the signals are only gated to the receiver during a window interval which is coextensive with that of the received bursts.

4 Claims, 2 Drawing Figures

TIME COMPRESSION MULTIPLEX DIGITAL TRANSMISSION SYSTEM

This invention relates to a digital transmission system and is particularly suited for use in a half-duplex system utilizing time compression multiplexing on telephone loops having discontinuities such as cable gauge changes and bridged taps.

BACKGROUND OF THE INVENTION

Existing subscriber loops can readily provide two-way digital transmission (full-duplex) on a pair of wires using analog signals at voice-band frequencies. This is achieved by amplitude-shift keying, phase-shift keying, frequency-shift keying, or other such techniques. However, full-duplex transmission of high-speed digital signals at ultra-sonic bit rates is difficult to achieve on a single communication path. It has been proposed therefore to employ a time compression multiplex (TCM) technique on a half-duplex transmission system wherein a burst-mode or ping-pong approach is utilized.

Typically in such TCM systems, the digital information signal to be transmitted is divided into discrete portions and each portion compressed with respect to time to form a so-called "burst", occupying less than one half the time of the original portion. The transmitter at each terminal alternately transmits the burst onto the path, following which the associated receiver at each terminal can receive a corresponding burst from the other transmitter. On receipt, each burst is expanded to occupy its original time span. Externally, the system appears to be transmitting the two digital information streams continuously and simultaneously i.e. full-duplex communication. So far as the transmission path is concerned, however, half-duplex transmission takes place with alternate bursts travelling in opposite directions.

Having transmitted its own burst, each transmitter must wait until the incoming burst from the other transmitter has been cleared from the communication path before it can transmit again. Arrival of the incoming burst will be delayed by at least a time interval equal to twice the transmission delay or propagation time of the path. The time interval (dead time) detracts from the efficiency of utilization of the communication path. Thus, for a given burst length, the efficiency decreases as the path length increases. The efficiency can be improved, for a given path length, by increasing the length of each burst, thus increasing the "on" time relative to the "dead" time. However, this exacerbates the synchronizing timing problem by increasing the corresponding reception interval during which the receiver is turned off and hence the receiver's clock receives no control bits to keep it synchronized.

Each receiver must be synchronized to the other's transmitter. U.S. Pat. No. 4,049,908, issued Sept. 20, 1977 and entitled "Method and Apparatus for Digital Data Transmission" describes a system in which a single pulse is transmitted at the beginning of each burst to establish synchronization. A paper entitled "A Long Burst Time-Shared Digital Transmission System for Subscriber Loops" by J. P. Andry et al, Societe Anonyme de Telecommunications, Paris, France, International Symposium on Subscriber Loops and Services 80, pp 31-35; describes an alternate system in which two synchronization framing bits are transmitted at the beginning of each burst.

Such systems function well on short loops, particularly with short bursts, in which strong signals are received. However, on long loops spurious signals resulting from cable irregularities such as gauge changes and bridged taps (which cause reflected pulses), can cause false synchronization to be established. This problem can be alleviated by providing a guard time (as described in U.S. Pat. No. 4,049,908) or by adding a unique sequence of much longer synchronization bits at the commencement of each burst. However, both of these solutions further reduce the data transmission efficiency. Consequently, a problem arises in establishing and maintaining frame synchronization and bit timing between the two terminals utilizing a minimum number of bits.

In a paper by R. Montemurro et al entitled "Réalisation d'un équipement terminal numérique d'abonné pour service téléphonique et de données", colloque international de commutation, International Switching Symposium, Paris, May 11, 1979, pp 926–933; there is described a synchronization technique in which two frame bits are added, one at the beginning and the other at the end of each burst. With this arrangement, false synchronization is more readily prevented than in the other systems since it can only occur if one or the other of the bits which was erroneously detected as a true synchronization bit, is outside the burst. Thus, essentially the only condition that can cause false synchronization to be detected is one in which the two detected bits, one a spurious bit and the other a signal bit, have the correct polarity and are spaced from one another by the correct interval. However, such a system still utilizes a guard time to insure that adequate decay of all reflected signals takes place before signal transmission commences in the opposite direction.

SUMMARY OF THE INVENTION

It has been found that improved frame synchronization can be established on digital loops utilizing the above described technique which uses two synchronization bits in each burst, by defining a burst window once synchronization is established, thereby eliminating the necessity for a guard time. Thus in accordance with the present invention there is provided in a digital transmission system, circuitry for transmitting bursts of digital signals of fixed length at fixed frame intervals, each burst beginning with an initial synchronization bit and ending with a final synchronization bit, these two bits being separated by a preselected number of signal bits. The system also includes circuitry for receiving the bursts of digital signals which includes means for establishing frame synchronization. The receiving circuitry also includes gating means responsive to the absence of frame synchronization for passing all received signals to the frame synchronization establishing means; and responsive to the presence of frame synchronization for passing only signals received during a window period which is coextensive with that of said bursts, to the frame synchronization means.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
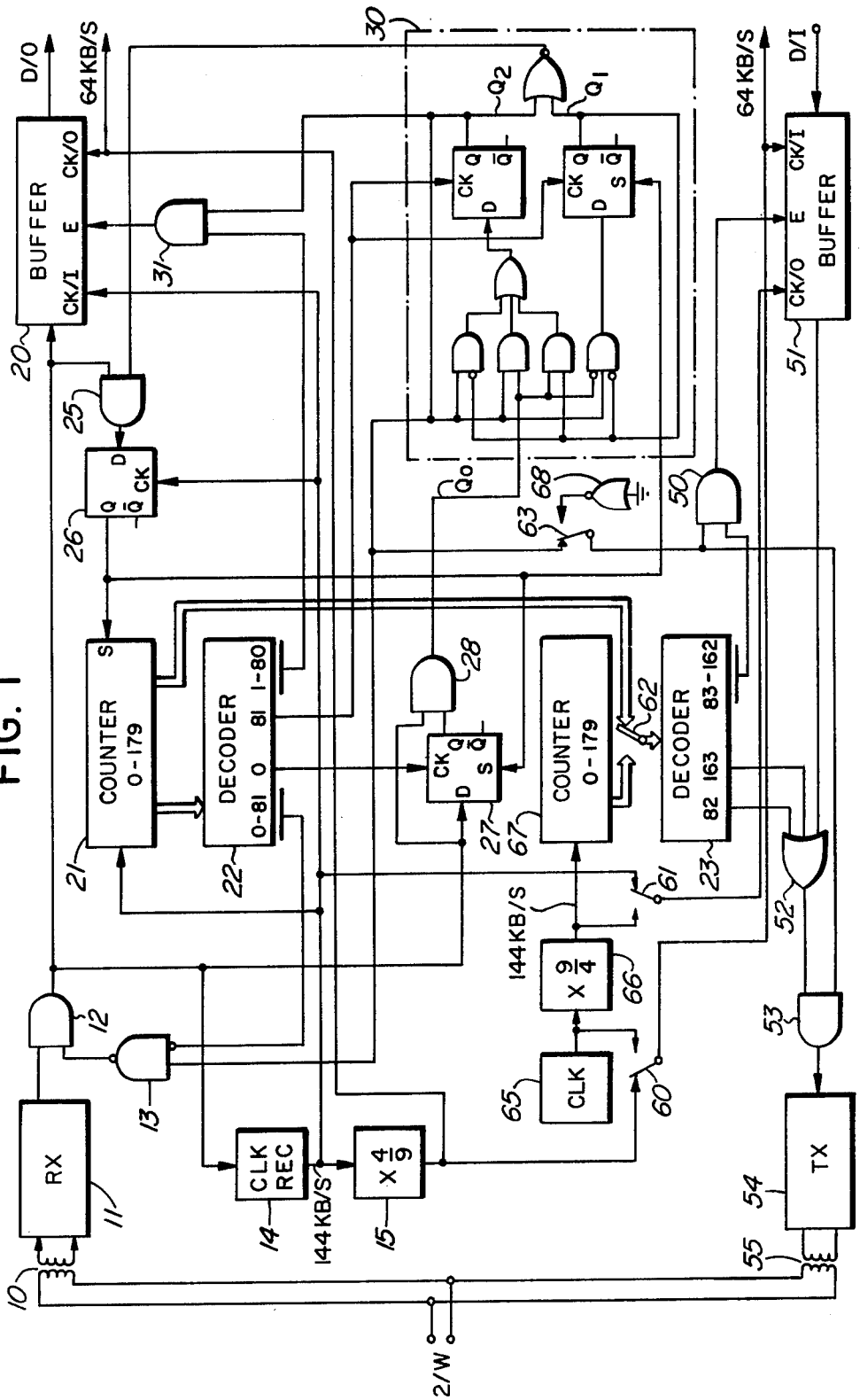
FIG. 1 is a block and schematic diagram of a circuit, which will function as either a central or a remote station in a digital transmission system, in accordance with the present invention.
Figure 2:
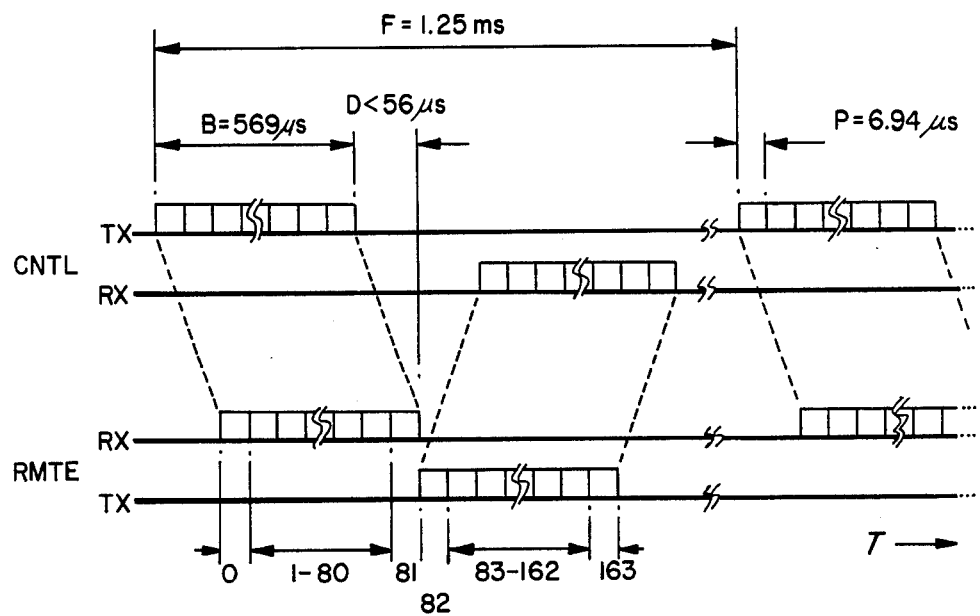
FIG. 2 is a wave form diagram of a digital signal which is transmitted and received by the circuit illustrated in FIG. 1.

Referring to FIGS. 1 and 2, when the circuit is functioning as a central station CNTL, bursts of digital signals are transmitted periodically at the frame rate regardless of whether or not bursts of digital signals are being received from the remote station. However, when the circuit is functioning as a remote station RMTE, signals are transmitted only when frame synchronization of the received signals has been established. The circuit in the example embodiment transmits at a bit rate of 144Kb/s. As illustrated in FIG. 2, each received or transmitted burst has a total of 80 information bits (1–80 or 83–162 respectively) preceded and followed by initial and final synchronization bits (0 & 81, or 82 & 163 respectively) for a total of 82 bits per burst. All synchronization bits are transmitted as logic 1's while the information bits may be logic 1's or 0's. At a bit rate of 144Kb/s, the bit period P=6.94 microseconds. This results in a burst period of B=569 microseconds. A frame interval of 1.25 milliseconds provides a sampling rate of 800 bursts per second in each direction. This allows a maximum transmission delay D=56 microseconds, providing a maximum loop length of about 8 kilometers.

Referring again to FIG. 1, the circuit functions as either a central station or a remote station depending upon the setting of four switches. With the settings illustrated, the circuit will function as a remote station. In addition, there are four possible modes or operating conditions of the circuit which are dependent upon the reception and recognition of the frame synchronization bits in the received digital signal bursts. These operating conditions which are set forth in Table II, control the reception and transmission of the digital signals at the remote station, and the reception only at the central station. This will be manifest together with the detailed structure of the circuit from the following description of its function and operation.

In the circuit of FIG. 1, bursts of digital signals received over a two wire transmission line 2/W (such as a telephone loop) are coupled through an input transformer 10 to a receiver 11 where automatic line build out and equalization are carried out in a well-known manner. The output of the receiver 11 is connected through an AND-gate 12 which is normally gated open by the output of a NAND-gate 13 during the anticipated period of arrival of the received signal burst. The output of the AND-gate 12 is fed to a conventional clock recovery circuit 14 which generates a stable 144Kb/s clock signal at its output. This clock signal is used to drive a 4/9 multiplier 15 which generates a 64Kb/s clock signal at its output.

The output of the AND-gate 12 is also fed to a buffer 20 which is used to convert the received signal bursts at the 144Kb/s rate to a continuous 64Kb/s digital signal at its output, thereby simulating a full-duplex transmission system at the lower bit rate. The 144Kb/s clock signal is also used to clock a 0-179 counter 21 having multiple outputs which are fed to both a receive-decoder 22 and a transmit-decoder 23 to provide gating signals during the designated bit periods of each frame interval in a well-known manner.

Prior to the reception of an initial signal burst, the remote station is in a no-sync or searching mode. In this mode, an initially received logic 1 (assumed to be the initial bit of a burst) is gated through an AND-gate 25 to set a D flip-flop 26. A logic 1 at the output of the flip-flop 26 then initializes the output of the counter 21 to 1 to synchronize it to the received digital signal. The logic 1 output of the flip-flop 26 is also used to set a D flip-flop 27 (i.e. samples the occurrence of an initial bit) so that the initial logic 1 synchronization bit of the burst is coupled through an AND-gate 28 to provide an input $Q_0$ to a logic circuit 30.

This circuit 30, which comprises four AND-gates, an OR-gate, two D flip-flops and a NOR-gate, functions in a well-known manner to produce the outputs $Q_1$ and $Q_2$ whenever the two flip-flops are clocked by the 81st bit period gating pulse from the output of the decoder 22. This logic circuit 30 functions in accordance with the truth table shown in Table I. The four possible output combinations of $Q_1$ and $Q_2$ determine the conditions detailed in Table II.

Initially, both outputs $Q_2$, $Q_1$ are logic 0's indicating a no-sync or searching condition. Upon reception of an initial logic 1 bit (whether it be the true initial synchronization bit of a burst or not), the $Q_2$, $Q_1$ outputs of the logic circuit 30 are set to logic 0,1 by the logic 1 output of the flip-flop 26, thus indicating a found initial bit condition. If true synchronization has been detected, the final logic 1 synchronization bit of the burst will be coupled from the output of AND-gate 12 through AND-gate 28, so that input $Q_0=1$ when the two D flip-flops are clocked by the 81st bit period gating pulse.

As shown in Table I, a $Q_0=1$ results in the $Q_2$, $Q_1$ outputs of the logic circuit 30 changing from a previous state of logic 0,1 to a next state of logic 1,0, indicating an in-sync or normal condition. The output $Q_2=1$ is the signal confirming frame synchronization. This output $Q_2$ is used to gate an AND-gate 31 which in conjunction with the decoder 22 provides an enabling signal to the buffer 20 during reception of bit periods 1–80 (corresponding to the received information signal bit periods) of each frame interval. Thus an output signal from the buffer 20 is obtained only when frame synchronization is confirmed. The signal confirming frame synchronization $Q_2$ together with that from the decoder 22, is also used to gate the NAND-gate 13 so that during subsequent bursts, its output will go to a logic 1 to gate the AND-gate 12 during the bit periods 0–81 of each frame interval. Thus once frame synchronization is established, the gate 12 is opened only during the anticipated period of reception of the received signal during each frame interval.

Once synchronization is established, the output of the logic circuit 30 remains in the in-sync or normal condition as long as synchronization bits are detected during the 0 and 81st bit periods of each frame interval. However, should an initial synchronization bit be lost, due to for instance a perturbation on the 2/W line, the Q output of the flip-flop 27 when clocked during the 0 bit period will go to a logic 0. This condition, or the absence of a final synchronization bit during the 81st bit period will make input $Q_0=0$. As seen from Table I, this causes the $Q_2$, $Q_1$ outputs of the logic unit 30 to go from logic 1,0 to logic 1,1 when the D flip-flops are clocked during the 81st bit period thereby indicating a lost one bit condition. Should either of the next two synchronization bits also be missing (i.e. $Q_0$ remains logic 0), the $Q_2$, $Q_1$ outputs will go from a lost one bit condition logic 0,1 to a no-sync or searching condition logic 0,0, as shown in Table I.

Thus, the loss of an isolated synchronization bit does not cause the loss of the signal confirming frame synchronization. However, the loss of alternate synchronization bits, or two or more consecutive synchronization bits will cause the loss of the signal confirming frame synchronization and the circuit to revert to the no-sync or searching mode. It will be evident that due to the widely spaced initial and final synchronization bits, short perturbations of less than 0.5 milliseconds will have no affect on the frame confirmation signal $Q_2$, thereby providing an inherent robustness to the system.

The presence of the synchronization confirmation signal $Q_2$ also gates an AND-gate 50 which in conjunction with the decoder 23 enables a buffer memory 51 so that the incoming digital information signal at a 64Kb/s rate is converted to bursts of digital signals at the 144Kb/s rate during bit periods 83–162 of each frame interval. This transmit information signal is then coupled through an OR-gate 52 where the initial and final synchronization bits occurring in bit periods 82 and 163 are added. The combined transmit burst signal at the output of the OR-gate 52 is gated through an AND-gate 53, under control of the synchronization confirmation signal $Q_2$, to a line transmitter 54. The output of the transmitter 54 is coupled through a transformer 55 to the 2/W telephone loop. Thus, at the remote station, bursts of digital signals are transmitted only when the synchronization confirmation signal $Q_2$ is present.

At the central station, the operation of the received portion of the circuit is identical to that described with respect to the remote station. However, the transmit portion at the central station operates continuously regardless of whether or not signals are being received from the remote station. For operation as a central station, switches 60, 61, 62, and 63 are switched to their alternate position. An internal 64Kb/s clock 65 is then used to clock the input of the buffer 51 and a 9/4 multiplier 66 which generates a 144Kb/s clock signal at its output. This signal is used to clock both the output of the buffer 51 and a 0–179 counter 67. The multiple outputs of the counter 67 are in turn connected through switch 62 to the transmit-decoder 23, the outputs of which are coupled to the AND-gate 50 and the OR-gate 52 as described with reference to the remote station. In this configuration, gates 50 and 53 are held open by a NOR-gate 68 having a grounded input.

TABLE I

| INPUT | PREVIOUS STATE | | NEXT STATE | |
|---|---|---|---|---|
| $Q_0$ | $Q_2$ | $Q_1$ | $Q_2$ | $Q_1$ |
| 0 | 0 | 0 | 0 | 0 |
| 0 | 0 | 1 | 0 | 0 |
| 0 | 1 | 0 | 1 | 1 |
| 0 | 1 | 1 | 0 | 0 |
| 1 | 0 | 0 | 0 | 0 |
| 1 | 0 | 1 | 1 | 0 |
| 1 | 1 | 0 | 1 | 0 |
| 1 | 1 | 1 | 1 | 0 |

TABLE II

| STATE | | CONDITION |
|---|---|---|
| $Q_2$ | $Q_1$ | |
| 0 | 0 | NO-SYNC/SEARCHING |
| 0 | 1 | FOUND INITIAL BIT |
| 1 | 0 | IN-SYNC/NORMAL |

TABLE II-continued

| STATE | | CONDITION |
|---|---|---|
| $Q_2$ | $Q_1$ | |
| 1 | 1 | LOST ONE (INITIAL/FINAL) BIT |

What is claimed is:

1. In a digital transmission sytem, comprising:
means for transmitting burst of digital signals of fixed length at fixed frame intervals, each burst including initial and final synchronization bits at the beginning and ending respectively of each burst; and
means for receiving the bursts of digital signals, including means for establishing frame synchronization:
the improvement comprising in the receiving means:
gating means responsive to the absence of frame synchronization for passing all received signals to the means for establishing frame synchronization; and responsive to the presence of frame synchronization for passing only signals received during a window period which is coextensive with that of said bursts, the means for establishing frame synchronization.

2. A digital transmisiion system having a central station and a remote station each including transmitting and receiving means as defined in claim 1 for alternately transmitting and receiving bursts of digital signals over a single transmission path;
the central station transmitting means includes means for initiating transmission of each burst at a fixed frame interval; and
the remote station transmitting means includes means for initiating transmission of each burst immediately after the remote station receives the burst from the central station transmitting means;
whereby the frame interval is not less than the total period of the two bursts from the central and remote transmitting means plus twice the transmission delay over the single transmission path.

3. A digital transmission system as defined by claim 2 in which the remote station additionally includes means for enabling the transmitting means only when the means for establishing frame synchronization generates a signal confirming frame synchronization.

4. In a digital transmission system, comprising:
means for transmitting bursts of digital signals of fixed length at fixed frame intervals, each burst including initial and final synchronization bits at the beginning and ending respectively of each burst; and
means for receiving the bursts of digital signals, including clock recovery means for generating clock pulses synchronized to bits of the digital signals received from the transmitting means:
the improvement comprising in the receiving means:
first means responsive to the initial and final synchronization bits for generating a signal confirming frame synchronization;
second means responsive to the clock pulses and the initial synchronization bit for generating a gating signal having a period coextensive with that of said bursts; and
gating means responsive to the absence of the signal confirming frame synchronization for applying all received signals to said first and second generating means and responsive to the presence of the signal confirming frame synchronization for applying the received signal bursts to said first and second generating means only during the presence of the gating signal.

* * * * *